US012799922B2

(12) United States Patent
Garcia et al.

(10) Patent No.: US 12,799,922 B2
(45) Date of Patent: Nov. 17, 2026

(54) WIND TURBINE BLADE ASSEMBLY DEVICE FOR EASY INSTALLATION AND REMOVAL IN VERTICAL POSITION

(71) Applicant: CLS Wind LLC, Houston, TX (US)

(72) Inventors: Andres C. Garcia, Missouri City, TX (US); Kent A. Johnson, Houston, TX (US)

(73) Assignee: CLS Wind LLC, Houston, TX (US)

( * ) Notice: Subject to any disclaimer, the term of this patent is extended or adjusted under 35 U.S.C. 154(b) by 0 days.

(21) Appl. No.: 18/854,720

(22) PCT Filed: Mar. 29, 2023

(86) PCT No.: PCT/US2023/016675
§ 371 (c)(1),
(2) Date: Oct. 11, 2024

(87) PCT Pub. No.: WO2023/200587
PCT Pub. Date: Oct. 19, 2023

(65) Prior Publication Data

US 2025/0250963 A1 Aug. 7, 2025

Related U.S. Application Data

(60) Provisional application No. 63/329,538, filed on Apr. 11, 2022.

(51) Int. Cl.
*F03D 13/10* (2016.01)
*B66B 9/00* (2006.01)
(Continued)

(52) U.S. Cl.
CPC .............. *F03D 13/104* (2023.08); *B66B 9/00* (2013.01); *B66C 1/108* (2013.01); *F03D 80/502* (2023.08);
(Continued)

(58) Field of Classification Search
CPC .. F05B 2230/61; F05B 2230/70; B66C 1/108; B66C 1/62; B66B 9/00;
(Continued)

(56) References Cited

U.S. PATENT DOCUMENTS 6,868,646 B1 3/2005 Perina
8,011,098 B2 9/2011 Vorhies et al.
(Continued)

FOREIGN PATENT DOCUMENTS

EP 2715113 B1 5/2012
EP 2746571 A2 12/2013
(Continued)

OTHER PUBLICATIONS

English translation of WO2015/140357 (Year: 2015).*
(Continued)

*Primary Examiner* — Moshe Wilensky
(74) *Attorney, Agent, or Firm* — KPPB Law; Kermit D. Lopez; Luis M. Ortiz

(57) ABSTRACT

Methods and systems for assembling a wind turbine blade for a wind turbine, can involve performing a vertical displacement of a blade holder elevator during assembly or disassembly of a wind turbine. The vertical displacement can be performed by a hard connection or a flexible connection. The hard connection can be based on a gyroscopic stability and can include a holder operable based on an ability of a wind turbine blade to freely rotate from a hub end on two axes while being elevated or lowered.

19 Claims, 8 Drawing Sheets

(51) Int. Cl.

| | |
|---|---|
| ***B66C 1/10*** | (2006.01) |
| ***F03D 80/50*** | (2016.01) |
| *B66B 9/02* | (2006.01) |

(52) U.S. Cl.
CPC ........... *B66B 9/022* (2013.01); *F05B 2230/61* (2013.01); *F05B 2230/70* (2013.01)

(58) Field of Classification Search
CPC ..... B66B 9/022; F03D 80/502; F03D 13/104; F03D 13/139
See application file for complete search history.

(56) References Cited

U.S. PATENT DOCUMENTS

| | | | |
|---|---|---|---|
| 8,047,804 | B2 | 11/2011 | Bagepalli et al. |
| 8,051,609 | B2 | 11/2011 | Olgaard |
| 8,069,634 | B2 | 12/2011 | Livingston et al. |
| 9,328,528 | B2 | 5/2016 | Gregor |
| 9,388,599 | B2 | 7/2016 | Homsi |
| 9,500,090 | B2 | 11/2016 | Hvid Nielsen |
| 9,657,495 | B2 | 5/2017 | Lockwood |
| 9,856,671 | B2 | 1/2018 | Jones et al. |
| 10,494,235 | B2 | 12/2019 | Nelson et al. |
| 2010/0044330 | A1 | 2/2010 | Vorhes et al. |
| 2010/0132299 | A1 | 6/2010 | Sathian |
| 2011/0056168 | A1 | 3/2011 | Springett et al. |
| 2012/0266796 | A1 | 10/2012 | Roodenburg et al. |
| 2013/0318789 | A1 | 12/2013 | Gabeiras et al. |
| 2014/0150227 | A1 | 6/2014 | Teichert |
| 2016/0369778 | A1 | 12/2016 | Davis |
| 2017/0016244 | A1 | 1/2017 | Keller et al. |

FOREIGN PATENT DOCUMENTS

| | | | |
|---|---|---|---|
| EP | 3163069 | A1 | 10/2015 |
| EP | 3260409 | A1 | 6/2017 |
| ES | 2326010 | B2 | 9/2009 |
| WO | 2013049266 | A1 | 4/2013 |
| WO | 2015140357 | A1 | 9/2015 |

OTHER PUBLICATIONS

International Application No. PCT/US23/16675, “PCT International Search Report”, Sep. 5, 2023.

International Application No. PCT/US23/16675, “Written Opinion of the International Searching Authority”, Sep. 5, 2023.

International Application No. PCT/US23/16675, “PCT Notification of Transmittal of the International Search Report and the Written Opinion of the International Searching Authority, or the Declaration,” Sep. 5, 2023.

International Application No. PCT/US23/16675, “Notification of Transmittal of the International Search Report and the Written Opinion of the International Searching Authority, or the Declaration,” Sep. 5, 2023.

* cited by examiner

WIND TURBINE BLADE ASSEMBLY DEVICE FOR EASY INSTALLATION AND REMOVAL IN VERTICAL POSITION

CROSS REFERENCE TO PATENT APPLICATION

This patent application is a 35 U.S.C. § 371 United States national stage application filing of International Application No. PCT/US23/16675 filed Mar. 29, 2023, entitled "Wind Turbine Blade Assembly Device for Easy Installation and Removal in Vertical Position," which designates the United States, and which in turn claims priority under the Patent Cooperation Treaty to U.S. Provisional Patent Application Ser. No. 63/329,538 filed on Apr. 11, 2022. International Application No. PCT/US23/16675 and U.S. Provisional Patent Application Ser. No. 63/329,538 are incorporated herein by reference in their entireties.

TECHNICAL FIELD

Embodiments are related to devices, methods, and systems for wind turbine installation. Embodiments further relate to wind turbine assembly devices and methods and systems for the installation and removal of wind turbine assembly devices in a vertical position.

BACKGROUND

Wind power is considered one of the cleanest, most environmentally friendly energy sources presently available, and wind turbines have gained increased attention in this regard. Wind turbines are used to convert kinetic energy of wind into electrical power. A modern wind turbine typically includes a tower, a generator, a gearbox, a nacelle, and one or more rotor blades. The rotor blades capture kinetic energy from wind using known airfoil principles and transmit the kinetic energy through rotational energy to turn a main shaft coupling the rotor blades to a gearbox, or if a gearbox is not used, directly to the generator. The generator then converts the mechanical energy to electrical energy that may be deployed to a utility grid, stored or used for other local means. A wind turbine typically includes a substantially large sized rotor (i.e., wheel) coupled to the nacelle disposed on top end of a tower. The nacelle includes a generator for producing electrical power from rotary motion energy produced by the rotor.

A traditional crane assisted installation approach is depicted in FIG. 1A to FIG. 1F below. FIG. 1A illustrates an image 10 depicting the components of a crane assisted installation operation including a tower, one or more tugger lines, a lifted blade, a yoke, a crane boom, sling wires, and a hub. FIG. 1B depicts an image 20 of the components of a crane assisted installation operation including a vertically lifted blade, Liftra Blade Skylark holder, and one or more tugger lines. FIG. 1C depicts an image 30 of the components of an external crane assisted installation operation including a complete hub with blades assembly, and one or more tugger lines being lifted. Furthermore, FIG. 1D illustrates an image 40 of the components of an external crane assisted installation operation including a complete hub with blades assembly, and one or more tugger lines being connected. Also, FIG. 1E shows an image 50 of the components of a crane assisted installation operation including an horizontally lifted blade, and one or more tugger lines. Finally, FIG. 1F depicts an image 60 of the components of a nacelle located crane assisted installation operation including a complete hub with blades assembly, and one or more tugger lines being connected.

Conventional technologies such as shown in the images 10, 20, 30, 40, 50, 60 in FIG. 1A to FIG. 1F use a method of installation involving the removal of blades and related components into position with a crane (or a group of cranes), whether external to the wind turbine or mounted on the same, such as via lifting jibs or wire-rope/sling operations.

With the increase in height and weight of wind turbines and related components, the need for large size, heavy lift cranes (onshore) and (offshore) heavy-lift or wind turbine installation vessels (WTIV) is ever more present. The conventional installation techniques depicted in FIG. 1A to FIG. 1F are not sufficient for handling the large size equipment and installation or repair capacity necessary with increased wind turbine installation. This lack of resources will eventually cause bottlenecks and delays in many wind farm projects.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, an aspect of the embodiments to provide for an improved wind turbine installation method and system.

It is another aspect of the embodiments to provide for a wind turbine assembly device for easy installation and removal in a vertical position.

It is another aspect of the embodiments to provide for a method and system for wind turbine installation and for the removal of blades, related components and other system.

The aforementioned aspects and other objectives and advantages can now be achieved as described herein. Methods and systems for assembling a wind turbine blade for a wind turbine, can involve performing a vertical displacement of a blade holder elevator during assembly or disassembly of a wind turbine.

In an embodiment a hard connection can be used for performing the vertical displacement of the blade holder elevator. The hard connection can be based on gyroscopic stability and can include a a holder based on the ability of the wind turbine blade to freely rotate from a hub end on two axes while being elevated or lowered.

In an embodiment, a flexible connection can be implemented for performing the vertical displacement of the blade holder elevator, wherein a holder allows the wind turbine blade to rotate from a hub end freely and securely on more than two axes while being elevated or lowered.

In an embodiment, the flexible connection can include at least one of: a chain, a cable or a polymer interface with an end of a wind turbine hub of the wind turbine.

An embodiment can further involve forming a rotor by connecting/disconnecting wind turbine blades from the wind turbine hub.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

Like reference numerals utilized herein can refer to identical or similar parts or elements.

DETAILED DESCRIPTION

Figure 1A:
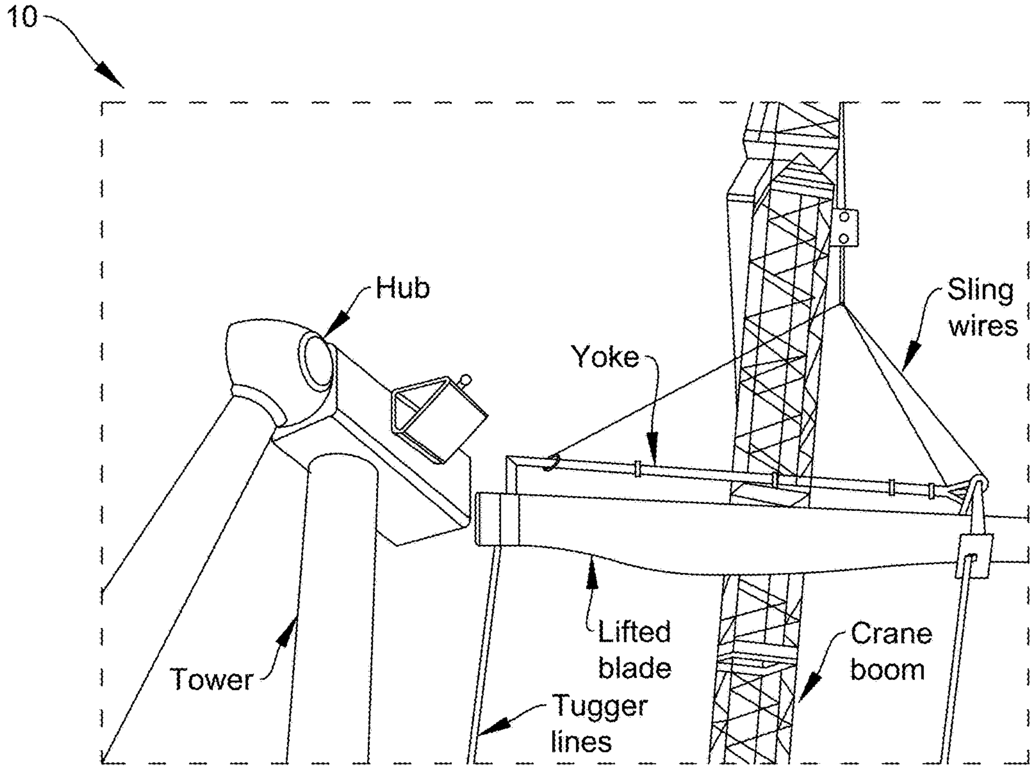
FIG. 1A PRIOR ART
FIG. 1A to FIG. 1F illustrate respective diagrams depicting methods and systems of conventional crane assisted installation.
Figure 1B:
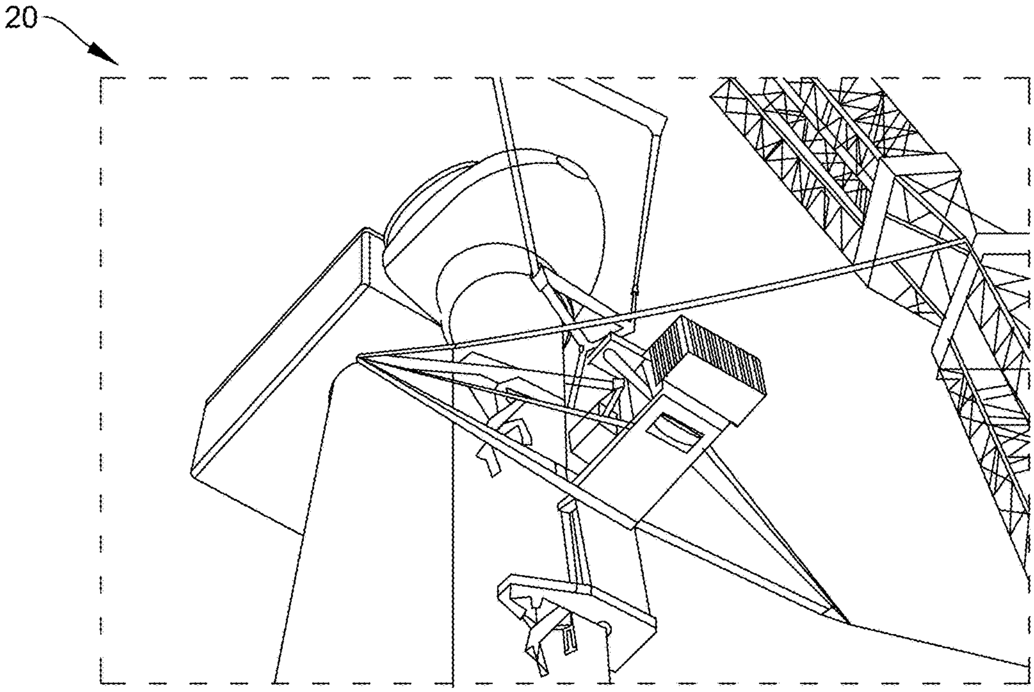
FIG. 1B PRIOR ART
Figure 1C:
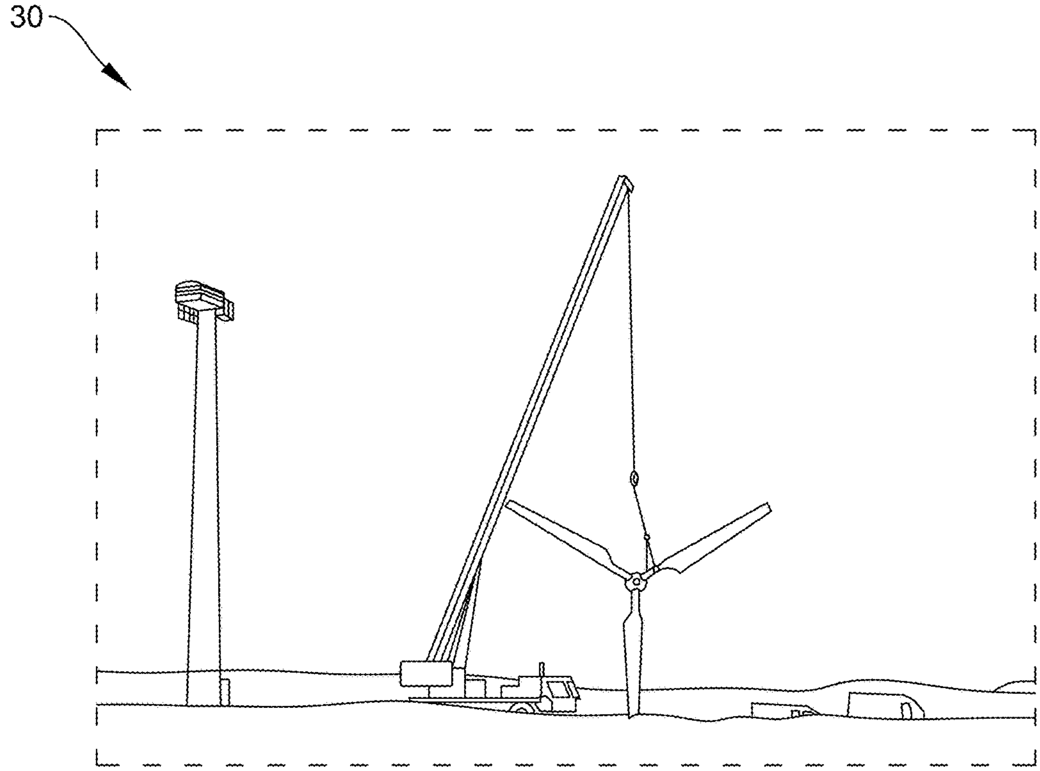
FIG. 1C PRIOR ART
Figure 1D:
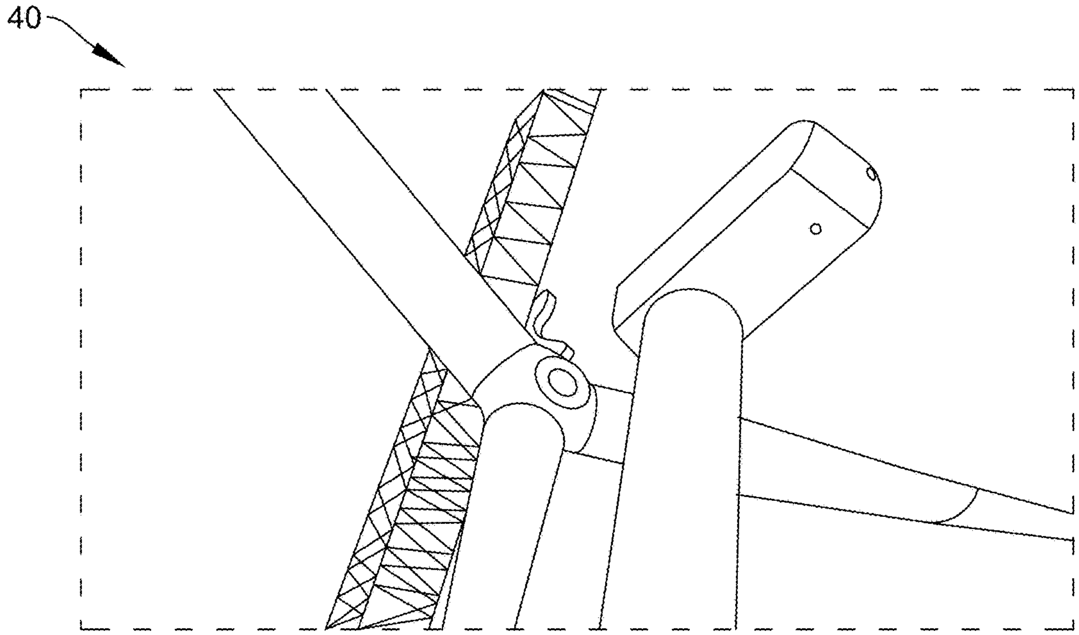
FIG. 1D PRIOR ART
Figure 1E:
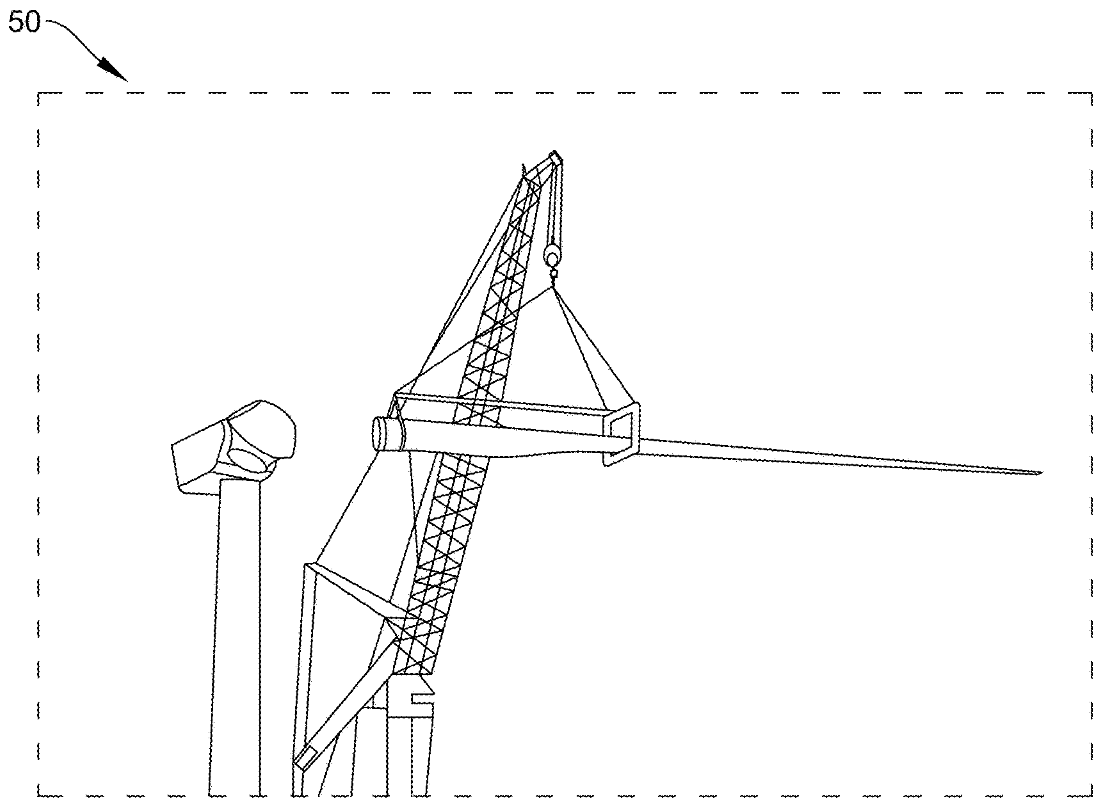
FIG. 1E PRIOR ART
Figure 1F:
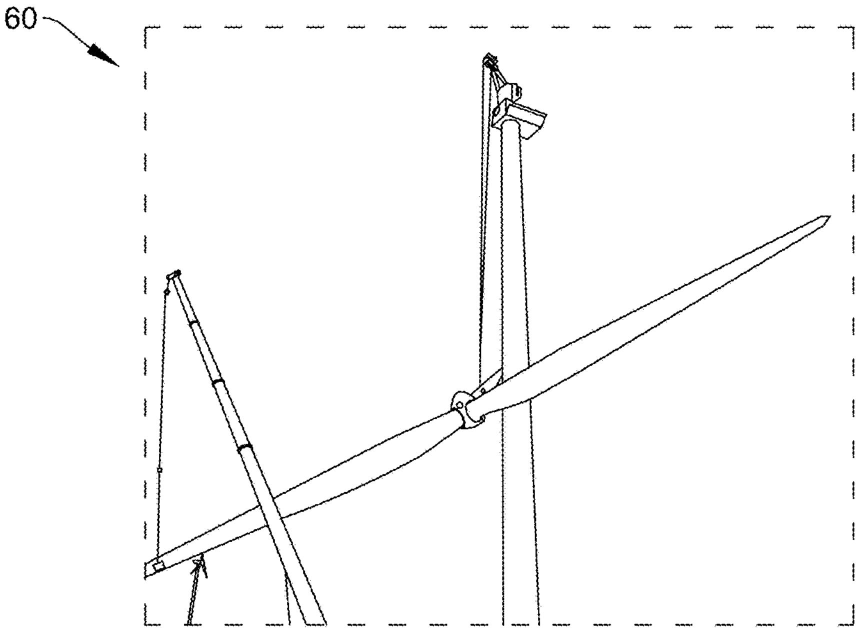
FIG. 1F PRIOR ART

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context.

In addition, the term "based on" may be understood as not necessarily intended to convey an exclusive set of factors and may, instead, allow for existence of additional factors not necessarily expressly described, again, depending at least in part on context. Furthermore, the phrase "at least one" may be understood to convey the meaning "one or more". For example, "at least one widget" may convey the concept of "one or more widgets".

As noted previously, currently used, conventional tower assembly technologies can use wind turbine tower assembly methods that involve lifting the wind turbine components into position with a crane. New approaches are being developed, which attempt to adapt conventional crane technologies for the erection of wind turbine components. These new approaches, such as climbing cranes, tower cranes and others, either utilize the wind turbine tower as its support foundation or member, or erect a box, lattice, or similar structure to install a jib or crane system.

As will become apparent as discussed in greater detail below, the disclosed embodiments do not use such previously discussed assembly techniques in either conventional or adaptations but includes its own unique track system to elevate a self-climbing platform to carry the loads up to a determine height, which once reached, can function with a horizontally translated motion to place the load into position. Key novel features of the embodiments include continuous vertical and horizontal motion/displacement; no limits on load and height capacity; load always secured into position (no swinging or pendulum issues) with controlled movements; and the ability to be used both onshore and offshore.

The embodiments allow a user to lift any weight to any height, whether onshore or offshore, without the need for large, high reaching, high-capacity cranes, for the installation of a complete wind turbine and/or its components. The embodiments also allows for smaller loads to be transported to the installation or repair site, minimizing both the environmental impact and reducing carbon emissions, versus conventional systems who have large mobilizations, great numbers of loads and heavy environmental impacts and carbon emissions.

The embodiments relate to an innovative method and system of assembling a wind turbine blade. This approach involves implementing methods and systems for performing vertical displacement for the blade holder elevator, during assembly and disassembly.

Figure 2A:
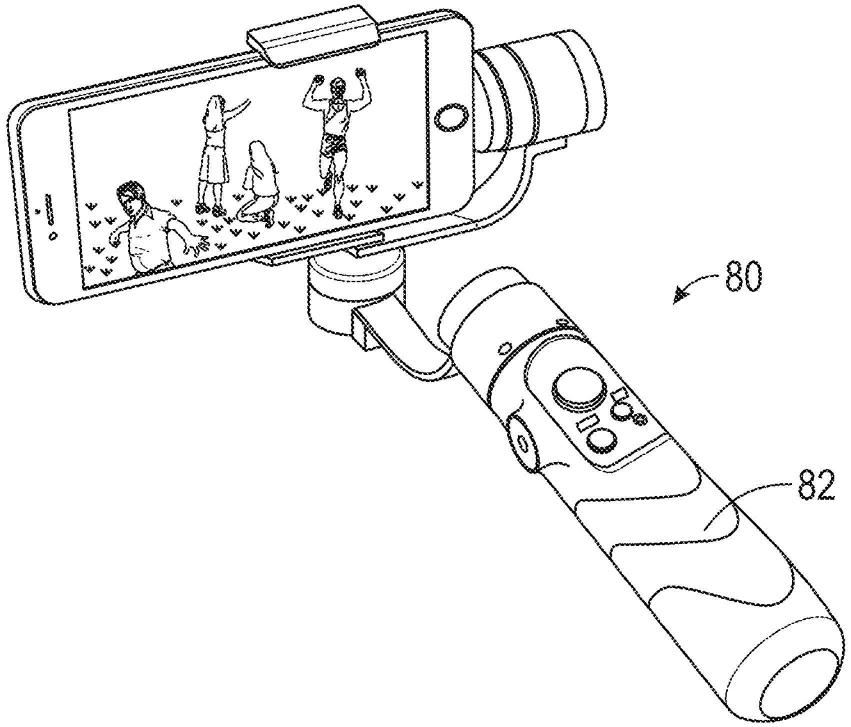
FIG. 2A illustrates a diagram depicting a gyroscopic arm handle, which can be implemented in accordance with an embodiment.
Figure 2B:
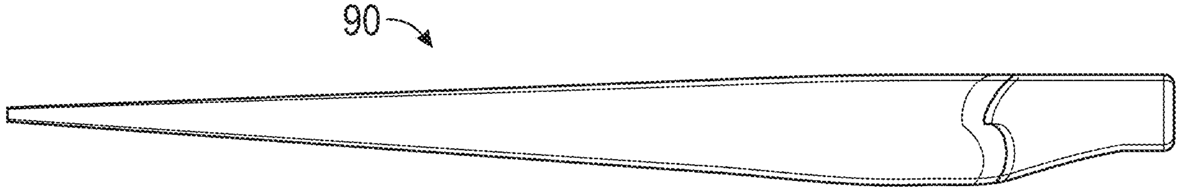
FIG. 2B illustrates a side pictorial view of a wind turbine blade, in accordance with an embodiment.

A wind turbine blade holder can be based on two systems. First, a hard connection can be implemented, based on a gyroscopic stability of similar systems, as demonstrated by the device 80 shown in FIG. 2A. That is, FIG. 2A illustrates a diagram depicting a gyroscopic arm handle 82, such as available with TV cameras, which can include a self-level and thus can align itself with the horizontal, and which may be required when one moves close to a hub on a wind turbine, so that the bolts will fit properly (e.g., sockets align) once the two flanges mate. In this case, a self-leveling bowl type support is desired so that a blade (e.g., such as the blade 90 shown in FIG. 2B and elsewhere herein) can be lifted vertically straight and not bent in any angle. The wind turbine blade holder can be based on the ability of a wind turbine blade such as the blade 90 shown in FIG. 2B to rotate from its hub end freely and securely on two axes while being elevated or lowered.

Second, a flexible connection can be implemented, for example with a chain, a cable or a polymer interface with the wind turbine hub end. In this second instance, the holder can allow the wind turbine blade to rotate from its hub end freely and securely on more than two axes while being elevated or lowered as depicted in FIG. 4A to FIG. 4C.

Figure 3A:
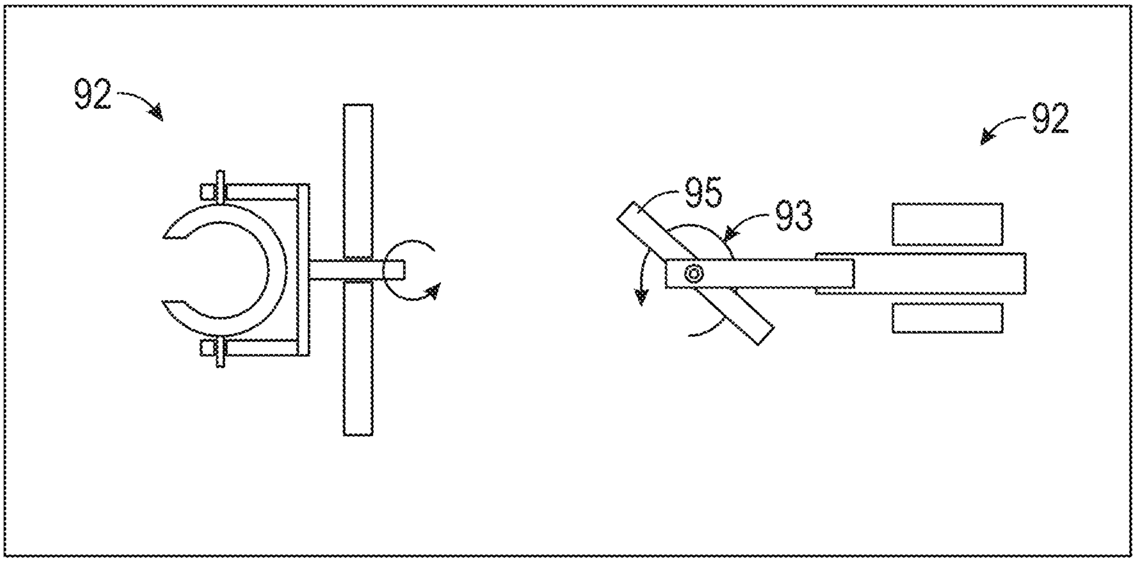
FIG. 3A illustrates a top view and a side view of a wind turbine blade assembly device, in accordance with an embodiment.

FIG. 3A illustrates a top view and a side view of a wind turbine blade assembly device 92, in accordance with an embodiment. The top view of the wind turbine blade assembly device 92 is shown at the left side of FIG. 3A, while the side view of the wind turbine blade assembly device 92 is shown at the right side of FIG. 3A. The circular arrow 93 shown in the side view of the wind turbine blade assembly device 92 in FIG. 3A indicates the rotatability of component 95.

Figure 3B:
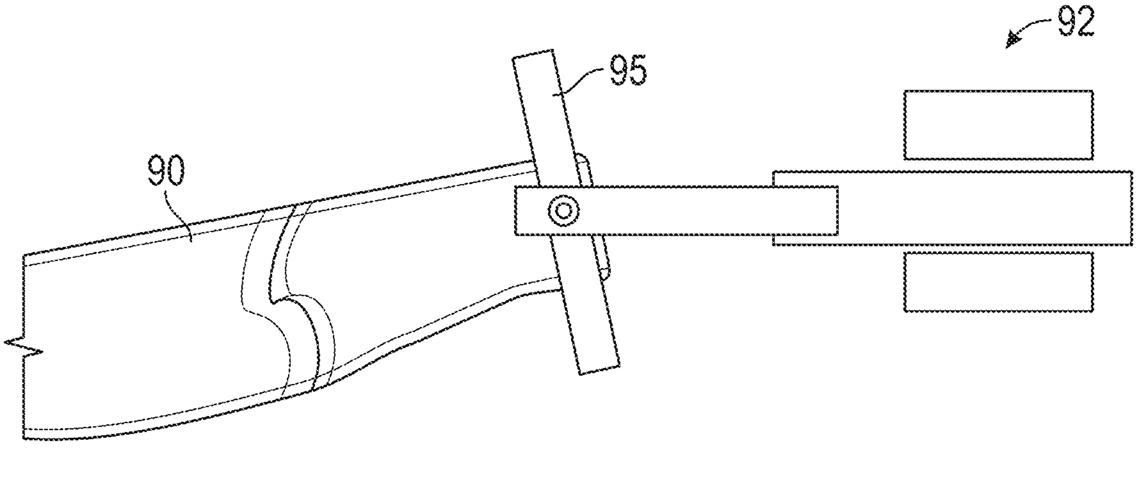
FIG. 3B illustrates a side view (at a low level) of the wind turbine blade assembly device engaging a wind turbine blade, in accordance with an embodiment.
Figure 3C:
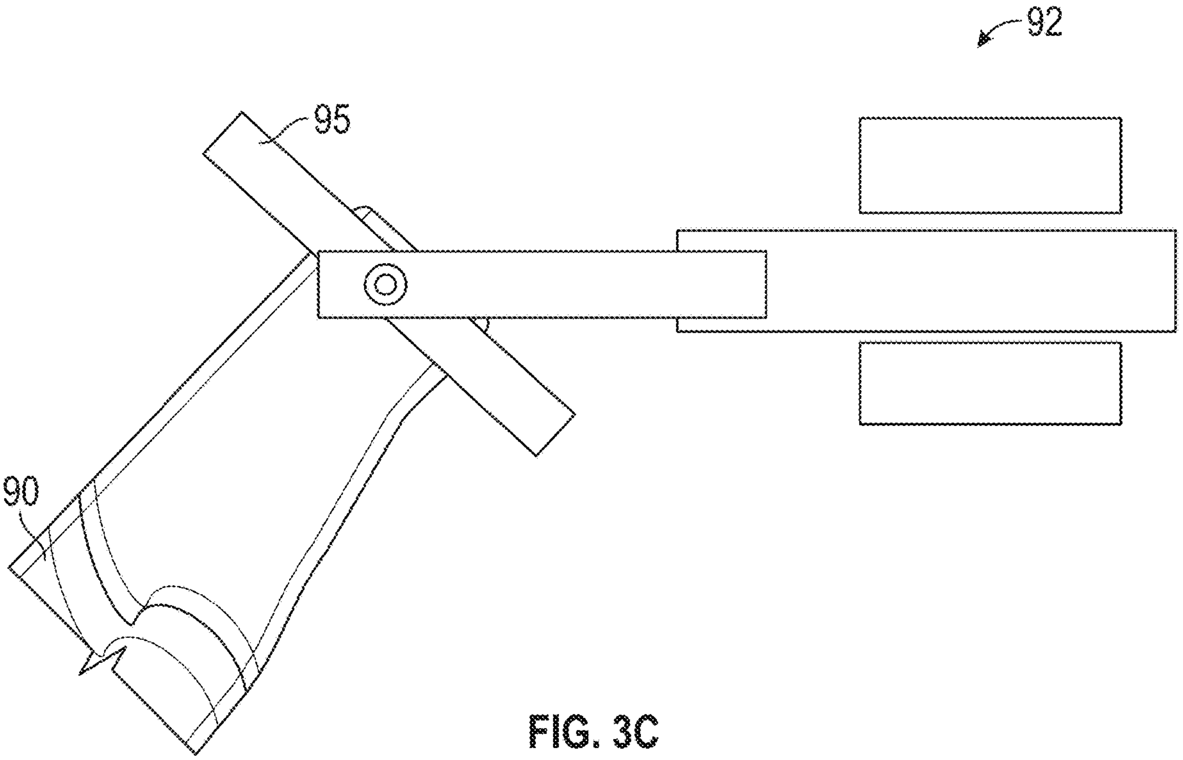
FIG. 3C illustrates a side view (at an intermediate level) of a wind turbine blade assembly, in accordance with an embodiment.
Figure 3D:
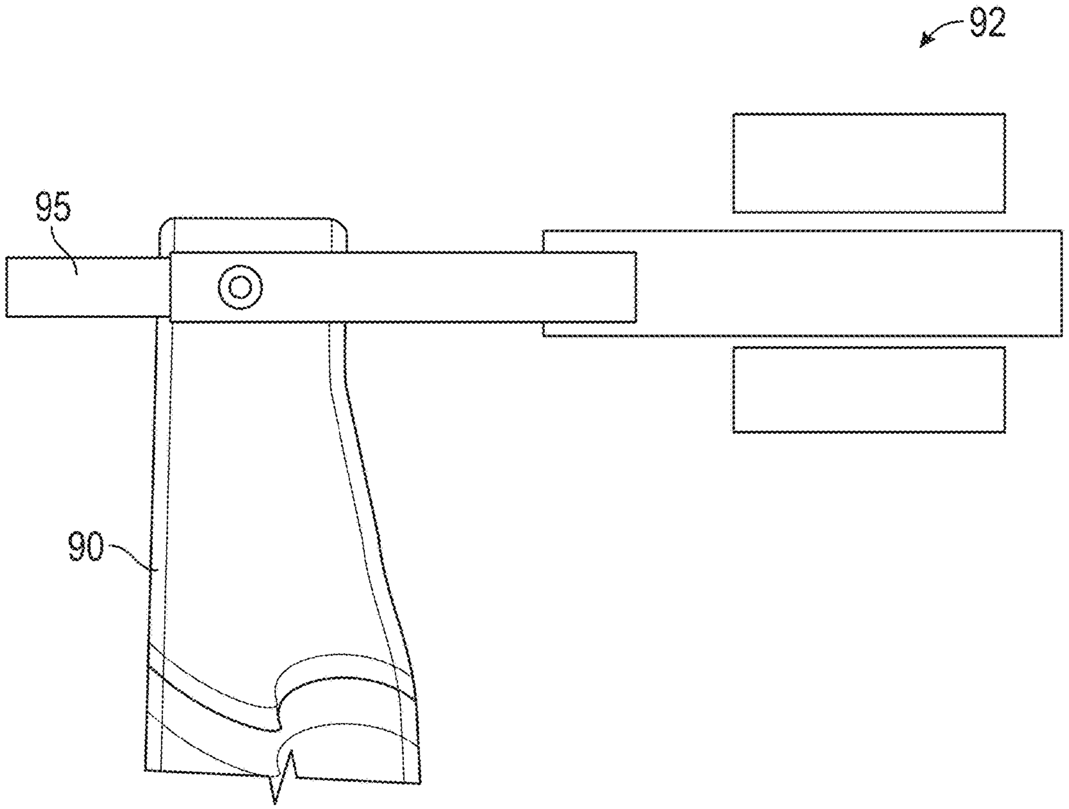
FIG. 3D illustrates a side view (at an intermediate level) of a wind turbine blade assembly, in accordance with an embodiment.

FIG. 3B illustrates a side view (at low level) of the wind turbine blade assembly device 92 engaging the blade 90 with the component 95, in accordance with an embodiment. FIG. 3C illustrates a side view (at intermediate level) of the wind turbine blade assembly device 92 engaging the blade 90, in accordance with an embodiment. FIG. 3D illustrates a side view (at intermediate level) of the wind turbine blade assembly device 92 engaging the blade 90, in accordance with an embodiment.

Figure 4A:
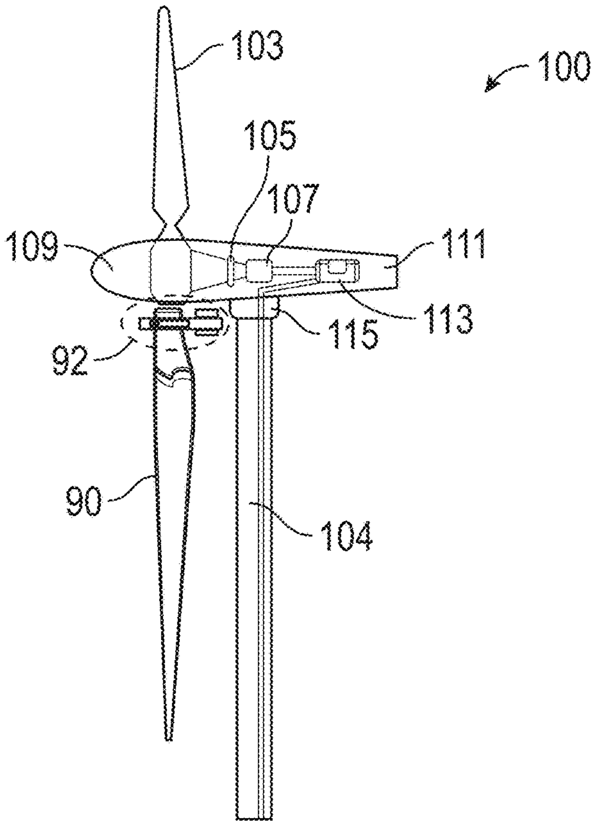
FIG. 4A illustrates a schematic diagram of a wind turbine blade assembly including the wind turbine blade assembly device engaging the blade, in accordance with an embodiment.
Figure 4B:
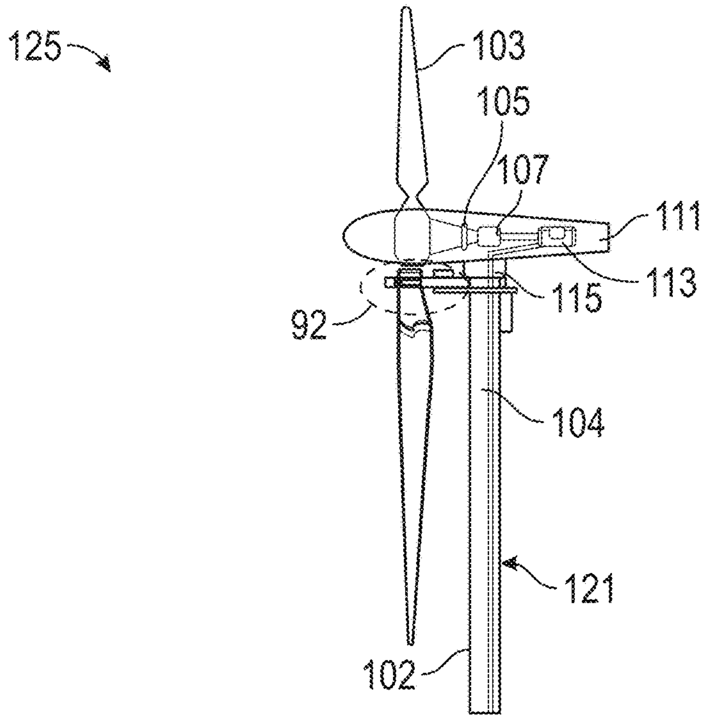
FIG. 4B illustrates a schematic diagram of an elevator-based wind turbine blade assembly, in accordance with an embodiment.
Figure 4C:
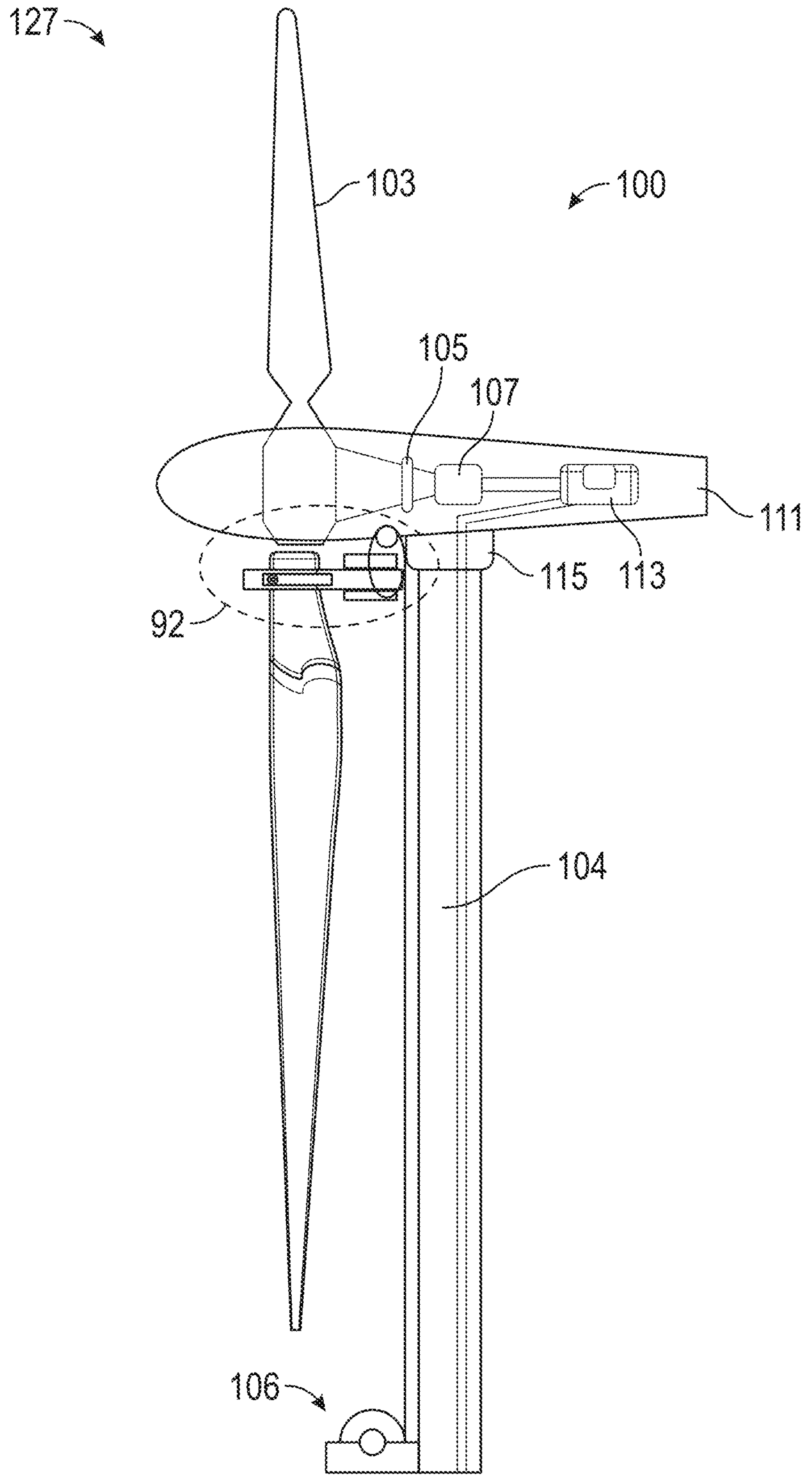
FIG. 4C illustrates a schematic diagram of a winch-based wind turbine blade assembly, in accordance with an embodiment.

FIG. 4A illustrates a schematic diagram of a wind turbine blade assembly 100 including the wind turbine blade assembly device 92 engaging the blade 90, in accordance with an embodiment. Other features shown in FIG. 4A include another blade 103 and a mechanical brake 105. A hub 109 is also shown with respect to the blade 90, the wind turbine blade assembly device 92, and the blade 90. Note that the wind turbine blade assembly device 92 is indicated in FIG. 4A, FIG. 4B, and FIG. 4C by dashed circular lines. A nacelle 111 is also shown with respect to a generator 112 and a pivoting system 115. The nacelle 111 and the hub are located above a pivoting system 115 toward the top of a tower 104.

FIG. 4B illustrates a schematic diagram of an elevator-based wind turbine blade assembly 127, in accordance with an embodiment. Note that the components shown in FIG. 4B are the same as those depicted in FIG. 4A but including the use of an elevating platform rack/rail 121.

FIG. 4C illustrates a schematic diagram of a winch-based wind turbine blade assembly 127, in accordance with an embodiment. The components depicted in FIG. 4C are similar to those shown in FIGS. 4A and 4B but include the use of a winch 106.

From the foregoing, it can be appreciated that a holder can support the blade from the strongest section of the wind blade assembly, which is located at the hub end of the blades, which allows for a flexible connection in that end to ensure that any unwanted forces are note induced when handling during the lifting sequence.

In an additional embodiment, a method for assembling all wind turbine blades, can involve connecting/disconnecting blades to/from the hub, thereby forming a rotor.

The conventional technologies such as those discussed in the background section of this disclosure use a method of installation and removal of blades and related components into position with a crane or cranes, whether external to the wind turbine or mounted on the same, such as via lifting jibs or wire-rope/sling operations.

The embodiments, however, do not use any of these methods, neither conventional cranes nor adaptations of the same, nor slings attached to the wind turbine, but has its own track system to elevate a self-climbing platform and blade holder to carry the loads up to a determine height, which once reached, will allow for connection to the hub/rotor and be able to install the blades. As an option, the self-climbing platform can also be elevated via wire-rope/winch combination, or any other similar lifting system with wire rope/pulleys.

This platform setup can also allow for installation of blade repair platforms (where service personnel can work from), which can be used to repair the blades in-situ.

Besides offering a safer installation method, the blade holder system of the embodiments can allow for the proper and secure handling of the blade and its components during installation, repair, or removal. Key novel features of the embodiments include continuous controlled vertical displacement, no limits on load and height capacity, a safer assembly method as compared to the previously discussed conventional approaches, loads that are always secured into position (no swinging or pendulum issues) with controlled movements, and the ability to be used used in onshore and offshore applications.

The embodiments are superior to prior approaches such as discussed previously herein, because they allow a user to install or remove any blade and related components, regardless of the weight and height required, whether onshore or offshore, without having a hanging load or the need for large, high reaching, high-capacity cranes, jib cranes, or related support systems.

With the increase in height and weight of wind turbines and related components, the need for large size, heavy lift cranes (onshore) and (offshore) heavy-lift or wind turbine installation vessels (WTIV) is ever more present. There is not enough of this large size equipment to supply the world with installation or repair capacity, and this lack of resources will cause bottlenecks and delays in many wind farm projects.

In addition, both the costs and time that takes to place the high-capacity lifting (crane) equipment on site is very costly and extensive. There are better installation methods that would allow for parallel installations and repairs, saving time and cost to the end user/owner.

Environmental damage and carbon emission reductions are also issues of great public interest. Our system also aims to reduce the environmental footprint by minimizing the area utilized at the wind turbine site, as well as the access roads, by using the smallest possible cranes and as few transport loads as possible.

Operational weather windows are also short, especially in northern locations with colder weather, and having the ability to extend the operational window will allow for more efficient operations and time savings.

In addition, there are many areas of the world that don't have either the resources or capacity to obtain large, heavy equipment, but they want to install, maintain, and repair large capacity wind turbines and blades, but will be unable to do it due to the scarcity of installation and repair resources. With our invention, we aim to allow any country, company, or person, to install and service any wind turbine blade that is desired, utilizing existing, small capacity cranes and fewer, safer resources.

The disclosed embodiments can solve the aforementioned issues, while providing safer, more efficient and economical blade operations. Possible applications for the embodiments also can include, for example, wind turbine OEMs for onshore and offshore use, wind turbine operation and maintenance, wind turbine blade servicing and repair, crane rental applications of any type, space or aerospace related industries, along with any industry or activity that may require lifting, repair and/or replacement of wind turbine blades or similar components. Other applications include offshore construction and/or repair applications involving lifting and handling systems in their operations, and EPIC/EPCI (engineering, procurement, installation, and commissioning) applications.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A system for assembling or disassembling a wind turbine blade for a wind turbine, comprising:

a wind turbine blade holder configured to engage a hub end of the wind turbine blade, wherein the wind turbine blade holder includes a self-leveling support having a gyroscopic stabilization mechanism that maintains a substantially horizontal orientation of the wind turbine blade during lifting or lowering, wherein the self-leveling support allows the hub end of the wind turbine blade to rotate freely and securely about at least two non-parallel axes while being vertically displaced; and a wind turbine blade holder elevator configured to vertically displace the wind turbine holder during the assembly or disassembly of the wind turbine, wherein the free rotational support of the hub end facilitates prevention of unwanted stress on the blade neck during handling of the wind turbine blade.

2. The system of claim 1 wherein the gyroscopic stabilization mechanism comprises a self-leveling bowl configured to maintain the wind turbine blade in a substantially horizontal orientation during vertical displacement.

3. The system of claim 1 wherein the wind turbine blade holder is configured to permit rotation of the hub end of the wind turbine blade about two non-parallel axes.

4. The system of claim 1 wherein the wind turbine blade holder is configured to permit rotation of the hub end of the wind turbine blade about more than two axes.

5. The system of claim 1 wherein the wind turbine blade holder elevator comprises a self-climbing platform configured to carry the wind turbine blade holder along a tower of the wind turbine.

6. A system for assembling or disassembling a wind turbine blade for a wind turbine supported by a wind turbine tower, comprising:

a vertically movable platform configured to support a wind turbine blade holder, wherein the vertically movable platform is displaced along a tower-mounted guide rail by a rack-and-pinion actuator, the wind turbine blade holder configured to engage a hub end of the wind turbine blade and to permit controlled rotation of the wind turbine blade about at least two axes during vertical displacement; and wherein the platform and wind turbine blade holder are configured to elevate or lower the wind turbine blade for connection to or disconnection from a hub of the wind turbine without requiring an external crane.

7. The system of claim 6 wherein the vertically movable platform comprises a self-climbing assembly guided along a rack and pinion chord next to a wind turbine tower, and not along-in contact with the wind turbine tower.

8. The system of claim 6 wherein the vertically movable platform is guided along a rack or rail structure coupled to a tower of the wind turbine and is displaced therealong by an actuator configured to engage the rack or rail structure.

9. The system of claim 6 wherein the wind turbine blade holder comprises a stabilizing interface configured to maintain the blade in a substantially horizontal orientation while allowing rotation of the hub end about at least two non-parallel axes.

10. The system of claim 6 wherein the vertically movable platform and wind turbine blade holder are configured to align the hub end of the blade with a rotor hub flange without use of an external crane.

11. The system of claim 6 wherein the vertically movable platform further supports a workspace for installation or maintenance of the wind turbine blades.

12. The system of claim 6 wherein the wind turbine blade holder includes a connection interface configured to couple with a hub end of the wind turbine blade, the connection interface comprising at least one of a chain, a cable, or a polymer coupling that permits multi-axis rotation of the hub end during vertical displacement of the platform.

13. A system for assembling or disassembling a wind turbine blade for a wind turbine, comprising:

a wind turbine blade holder configured to engage a hub end of the wind turbine blade;

a support interface coupled to the wind turbine blade holder and configured to maintain the wind turbine blade in a substantially horizontal orientation while permitting rotation of the hub end of the wind turbine blade about multiple non-parallel axes during lifting or lowering; and a vertically movable platform configured to elevate or lower the wind turbine blade holder along a tower-mounted guide structure during the assembly or disassembly of the wind turbine, wherein the support interface is structured to stabilize the orientation of the wind turbine blade and to reduce mechanical stress at the hub end during handling.

14. The system of claim 13, wherein support interface comprises a self-leveling assembly configured to maintain alignment of the wind turbine blade holder with a hub flange during connection or disconnection of the wind turbine blade.

15. The system of claim 13, wherein the self-leveling assembly comprises a gyroscopic or gimbal mechanism configured to maintain a substantially horizontal orientation of the wind turbine blade during vertical displacement.

16. The system of claim 13, wherein the wind turbine blade holder permits the hub end of the wind turbine blade to rotate freely and securely about at least two non-parallel axes during elevation or lowering.

17. The system of claim 13, wherein the support interface comprises a connection assembly including at least one of: a chain, a cable, or a polymer coupling secured to the hub end of the wind turbine blade.

18. The system of claim 13, wherein the connection assembly is configured to allow the hub end of the wind turbine blade to rotate about more than two non-parallel axes during lifting or lowering.

19. The system of claim 13, wherein the connection assembly is structured to accommodate movement of the wind turbine blade holder along a rack or rail coupled to a tower of the wind turbine.

* * * * *